P. H. A. GAILLET.
COMBINATION OF PYRAMIDAL SURFACES FOR THE PURIFICATION OF LIQUIDS, VAPORS, AND GASES.
APPLICATION FILED NOV. 19, 1919.
1,403,311.
Patented Jan. 10, 1922.
2 SHEETS—SHEET 1.
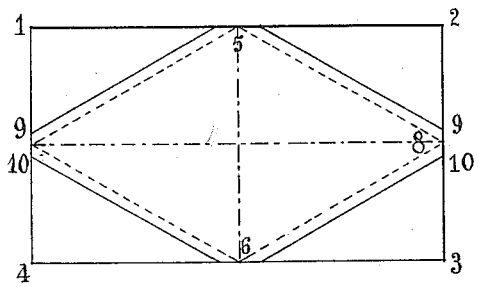
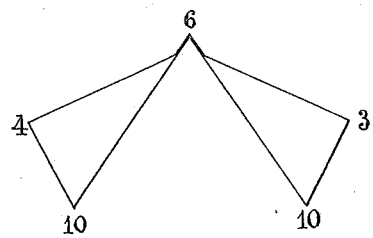
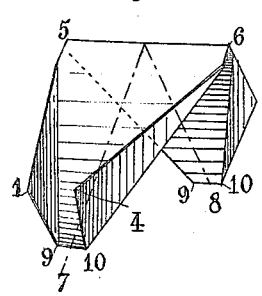
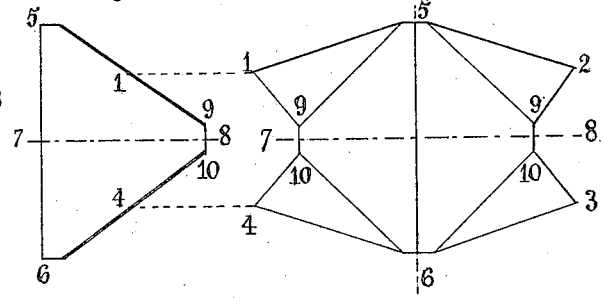
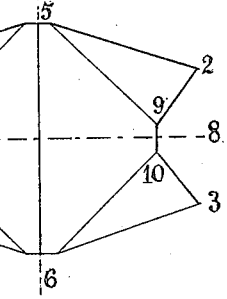
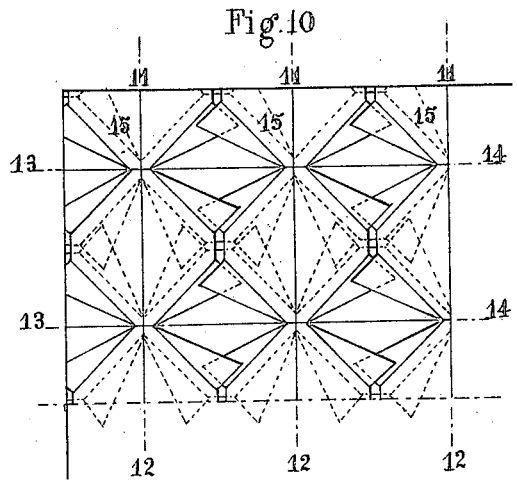
INVENTOR
PAUL H.A. GAILLET
BY Howson and Howson
ATTORNEYS P. H. A. GAILLET.
COMBINATION OF PYRAMIDAL SURFACES FOR THE PURIFICATION OF LIQUIDS, VAPORS, AND GASES.
APPLICATION FILED NOV. 19, 1919.

1,403,311.

Patented Jan. 10, 1922.

INVENTOR
PAUL H. A. GAILLET,
BY Howson and Howson
ATTORNEYS

UNITED STATES PATENT OFFICE.

PAUL HENRI AUGUSTE GAILLET, OF CYSOING, FRANCE.

COMBINATION OF PYRAMIDAL SURFACES FOR THE PURIFICATION OF LIQUIDS, VAPORS, AND GASES.

1,403,311.　　　　　　　Specification of Letters Patent.　　Patented Jan. 10, 1922.

Application filed November 19, 1919. Serial No. 339,253.

*To all whom it may concern:*

Be it known that I, PAUL HENRI AUGUSTE GAILLET, a citizen of the Republic of France, and a resident of 56–58 Rue de Lille, Cysoing, Department of Nord, France, have invented new and useful Improvements in Combinations of Pyramidal Surfaces for the Purification of Liquids, Vapors, and Gases, (for which I have filed applications in France Oct. 18, 1918, Patent 492,369; England Oct. 17, 1918, Patent 133,971; Belgium Oct. 9, 1919, and Spain Oct. 15, 1919,) of which the following is a specification.

The present invention refers to a diaphragm for the purification of liquids, vapors and gases.

According to the invention, the diaphragm is formed by the grouping of several units, each having the shape of a dihedral angle with closed apex, of which the two faces are of substantially triangular form and comprise on each of their sides a lateral face, which is also of triangular form and arranged at a suitable angle in relation to this face of the dihedral angle, in such a way that the units form by their combination pyramidal surfaces.

These units of pyramidal surfaces are preferably constituted by sheets or plates, of rectangular or square shape, the angles of which have been turned up by bending along lines parallel to the straight lines joining the ends of the axes of the sheet and the latter having then been bent down by folding around one of its arms.

The units are placed upon rectilinear supports, preferably horizontal, in multiple rows which may be as close together as desired, which allows of increasing at will the surface in an apparatus of given capacity.

As a result of the shape of the units, the supports of one horizontal row may be crossed at right angles with the supports of adjacent rows, so as to constitute actual inverted pyramids affording between their faces the space necessary for the circulation of the fluid to be purified, the circulation taking place without any modification of speed, and the fluid always occupying simultaneously the whole section of the vessel while being continually distorted in this section between the walls of the pyramid.

It has already been proposed (see British Patent 22546/1891) to employ as diaphragms combinations of surfaces comprising several elements in each stage or tier, the elements of one stage being arranged parallel to one another, in each stage and having their axes at right angles in relation to the elements of the adjacent stages; but the surfaces employed to constitute the diaphragms were quite different from those employed in the present invention.

In the known construction, the elements consisted of ridges or dihedral angles, formed by two rectangular plates, the apices or angles being open over almost the whole length to allow the passage of liquid. In accordance with the present invention, each element consists of a dihedral angle of which the two faces are substantially triangular and comprise on each of their sides a lateral face, likewise substantially triangular and arranged at a suitable angle in relation to this face of the dihedral angle; the fold or bend which separates the two principal faces is necessarily closed, as well as the other bends, the liquid or other fluid cannot pass through the apex of the dihedral, but is obliged, on the contrary, to circulate in a lateral direction.

In the known construction, the ridges rest one upon another without any other means of suspension, and are thus all connected together. In the present invention, the units are mounted astride of supports and each row or tier is independent of the next.

In the construction already known, the grouping of the ridges does not give them any special property and it compulsorily limits the number of rows; in the arrangement forming the subject of the present invention the units are complete and self-contained in each stage, and form actual hoppers to receive the deposits and lead them to the base of the apparatus, without at any time reducing the sectional area of the passage for the liquid or fluid. Moreover this arrangement allows of multiplying the number of rows by bringing the axes closer together as desired.

The diaphragms in the present invention are formed by combinations of surfaces which are essentially geometrical, allowing a much more involved and efficient circulation, while being of much simpler manufacture and installation.

In the accompanying drawings—

Figure 1 represents the method of obtaining a pyramidal element, starting from a flat rectangular sheet.

Figure 2 represents in elevation, and Figure 3 in plan, the result obtained.

Figure 4 is a side view of the element obtained by adopting for the bending angle of the turned up triangles a value such that their projection upon the vertical plane coincides with that of the bend.

Figure 5 is a perspective view of the finished element.

With these pyramidal elements, there can be produced a large number of combinations.

Figure 6:
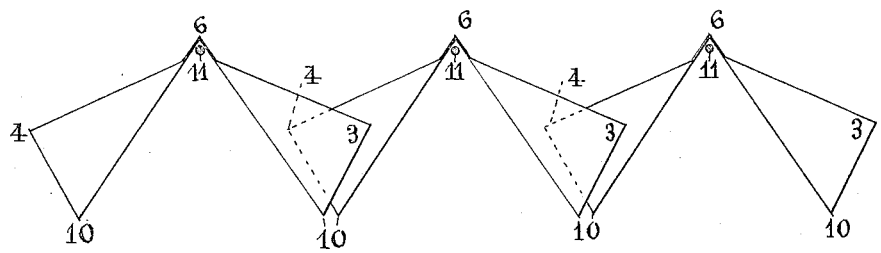

Figure 6 shows by way of example, and in elevation the juxtaposition of three similar elements placed upon parallel axes 11, 11, and 11.

Figure 7:
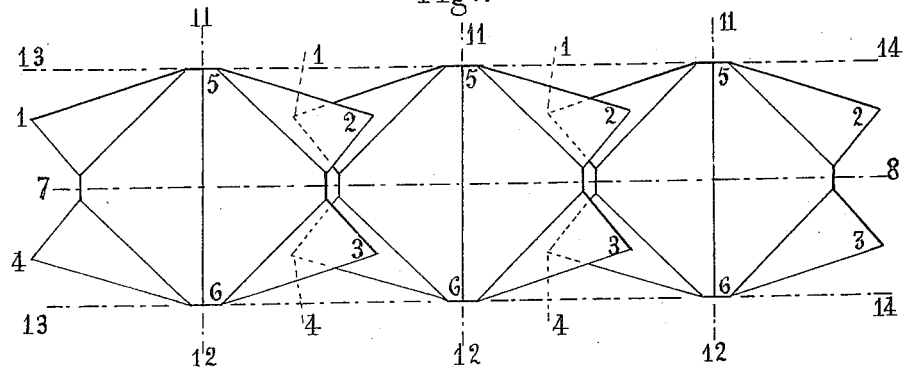

Figure 7 shows in plan the same arrangement upon axes 11—12, 11—12 and 11—12.

Figure 8:
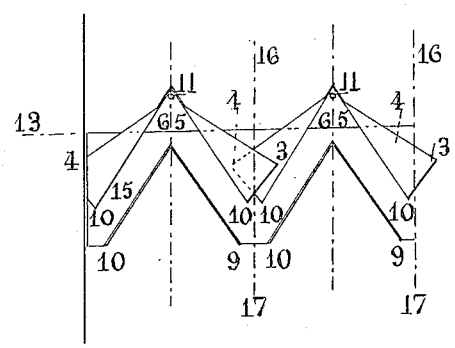
Figure 9:
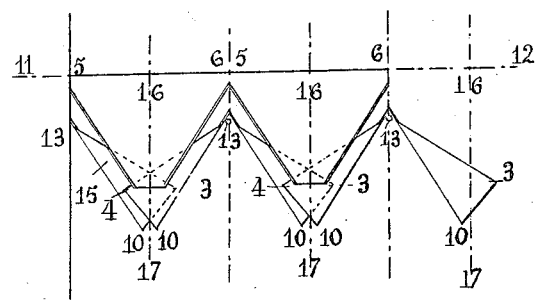

Figures 8 and 9 show, in front elevation an in side elevation respectively, the superposition on crossed axes of two stages of juxtaposed pyramidal elements.

Figure 10 is a top plan view of the said two superposed stages.

Each pyramidal element is obtained by starting from a flat rectangular sheet 1—2—3—4 (Figure 1), by simple bending and without any waste, which is of the greatest importance as regards the cost of production. After having traced the axes 5—6 and 7—8, the diagonals 7—5, 5—8, 8—6 and 6—7 are drawn and also lines parallel to these diagonals from symmetrical points 9 and 10, spaced in relation to the axis 7—8, by the amount which is convenient for opening the apex of the pyramid in the desired proportion for the object in view. When this is done, the four triangles of which the apices are at 1, 2, 3 and 4, are turned up to a suitable angle in relation to the plane of the sheet; the latter is then bent along the transverse axis 5—6 to an angle which likewise is chosen according to the object in view.

All the elements being alike and constituting symmetrical objects in relation to their axis, it will be evident that horizontal axes 11—12 can be superposed and brought together as closely as desired in the vertical direction, subject only to the space occupied by the material axes serving as supports. But again, and this is one of the essential arrangements of the invention, after having formed one row upon the axes 11—12, 11—12 and 11—12 (Figure 7), it is possible to arrange the following upon axes 13—14, 13—14, placed at right angles in relation to the axes 11—12, on condition of interposing these axes between the elements of the adjacent row. If the axes 11—12 are called longitudinal, the perpendicular axes will be transverse, and the special shape of the pyramidal elements evidently allows also of bringing the transverse axes as close as desired to the longitudinal ones, that is to say the crossed rows may be multiplied at will, subject only to the space necessary in practice to accommodate the supports, and, as has been stated above, on condition of interposing the transverse axes between the elements of the adjacent row.

If the supports are taken away by reducing them to the corresponding geometric axes, the juxtaposition of the elements of one row and their superposition with the crossed elements of the other row, which are in this way brought into contact, will form quadrangular pyramids of which the four faces belong to four separate elements. On the other hand by suitably selecting the dimensions of the sheets, the angles of bending and the distances between the supporting axes, matters may be so arranged that the pyramids are regular. This result is obtained in particular, when the distance between the axes 11—12 and 11—12 is equal to the width 5—6 of the sheet. By selecting a suitable length 1—2, this same regularity of the pyramids can be obtained by giving to the bend along the transverse axis 5—6 an appropriate angle.

If the four lateral triangles of which the apices are at 1, 2, 3 and 4, had been turned up along the diagonals 7—5, 5—8, 8—6 and 6—7, the pyramids would be complete, that is to say they would have a real geometrical apex. In these conditions the hoppers thus formed would leave no passage for the circulation of the fluid or for the evacuation of the materials to be separated. It is for this reason that the four triangles were turned up along lines parallel to the diagonals, which results in opening the apex. Moreover in this way the top of the bend does not reach the ridge of the dihedral angle formed by the bend along 5—6, which fact facilitates the construction and allows the element to be placed astride the support with greater ease. In practice the axes of one row are displaced vertically in relation to the crossed axes of the row situated immediately above or below; in this way the tight fitting of the pyramids theoretically obtained by the geometrical superposition above described, is suppressed, while preserving their action as hoppers, and the passages necessary for the circulation of the fluid are provided.

It will be noted that in the supposed case of geometrical superposition mentioned, the pyramids would be already complete, apart from the up-turned triangles, so that the latter would simply duplicate the thickness of the wall in the part corresponding to their surface. They would thus have no active effect. But by the vertical displacement of the crossed axes, which is necessary both for construction and for circulation, these triangles receive an important duty, because they form by their juxtaposition the separated matter towards the openings of the hoppers, while the gap which they cause in the face of the theoretical pyramid serves for the circulation of the fluid.

If a vessel be considered, of which the whole cross-section is fitted with pyramidal elements of this kind, for a certain height, it will be understood that the fluid circulated therethrough in an upward or downward direction would be obliged to suffer continual distortion throughout its travel, being flattened out as it were between all the pyramidal faces. Let it be supposed for example that solid substances held in suspension in a liquid are to be separated; the liquid circulating upwards will always occupy the whole of the horizontal sectional area of the vessel, this area being equal to the geometrical section less the surface occupied by the thickness of the sheets. As this thickness will always be as small as possible, it may be neglected and the whole sectional area taken as utilized, the velocity therefore remaining uniform during the upward movement. This will also represent a minimum, essentially favourable for decantation.

In apparatus with closed walls, as in the French patent specification 151693 of October 24th, 1882, the current of liquid is confined between the walls which all its molecules do not necessarily touch. The action of decantation as well as that of molecular attraction, which is of considerable importance in retaining the matters in suspension, is then subject to the distance which separates each solid molecule from the adjacent wall. With the combination of pyramidal surfaces according to the present invention, there is no longer a current of liquid properly speaking; it is the whole mass which moves vertically in horizontal layers, while the sheets forming the pyramids cause it to undergo a continual distortion in the whole horizontal section. This results in multiplying enormously the chances of contact between the solid molecules and the walls, and therefore of successful separation. This explains the much higher efficiency of the new apparatus. The importance of the distortion of the liquid mass during its travel through the labyrinth of pyramidal surfaces may be appreciated by considering horizontal sections of the latter. All the sections are homothetic, and by imagining them to be multiplied between two adjacent stages, it will be seen that the section through the supports of one makes complete parallel barriers following the position of the said supports, while the section through the supports of the other likewise corresponds to complete barriers perpendicular to those of the first. These transformations resulting from the shape and working of the sheets takes place progressively, without creating currents, without giving rise to shocks, and without altering the velocity of upward movement. By comparing the horizontal sections of two adjacent stages, it will be seen that the plane passing through the theoretical apices of the pyramids, reduces the section for each of them to a geometrical point, while the plane passing through the supports, that is through the bases of the pyramids, gives complete barriers. Between these two extremes there are obtained all the intermediate homothetic figures and since they are produced also for the adjacent stage, at ninety degrees in relation to the first, it is evident that all these distortions contribute to augment considerably the efficiency of the apparatus.

The solid matter separated on the one hand by decantation proper and on the other hand by molecular attraction, commences by covering uniformly the walls of the pyramids, but when it has accumulated to a thickness which depends both upon its nature and the degrees of viscosity of the liquid, and also on the nature of the latter, it becomes detached if the slope of the pyramidal faces has been suitably chosen, and descends automatically towards the orifice of the hopper and escapes after having in this way been agglomerated to some extent into concentrated threads.

In the example of superposition on crossed axes represented in front elevation in Figure 8 and in side elevation in Figure 9, for two stages only, the hoppers are placed along concordant vertical axes 16—17, so that the material which falls from an upper hopper gains directly the orifice of the lower hopper; it is consequently not taken up by the rising liquid, or only in a proportion which can in no way affect the final result.

Figure 10 represents the simultaneous view in plan of two stages, and it characterizes well the desired complication of the system.

The shape of the pyramidal elements described above leads to the adoption in principle of vessels of square or rectangular section. By selecting suitable relative dimensions for the vessels and the elements, with the use of parallel axes, the whole section can be fitted with similar complete elements, like that represented in Figures 2, 3 and 4, except for making an additional bend for the up-turned triangles which abut against the wall of the vessel. The elements formed according to Figures 2, 3 and 4, may conveniently be called "normal."

When on the other hand the axes are crossed, it will be seen from Figures 8, 9 and 10, that if this crossing is to be made to form the pyramids previously described, it will be necessary, if the whole section is to be uniformly fitted in all the stages, to employ along the walls of the vessel certain elements having only one-half the width of the normal elements. These special elements 15, which may be called "border-tiles" are identical with the "normal tiles" and are obtained simply by dividing the latter into two equal parts in the longitudinal direction of the sheet. In other words, referring to Figure 1, it is sufficient to start from a rectangular sheet 1—2—8—7 and to turn up the two triangles of which the apices are at 1 and 2, to obtain a "border-tile" by simple bending and without any waste. All the border-tiles are similiar.

It is important to note that it is not indispensable for the vessels to have a square or rectangular section. These shapes are preferable on principle, because, especially when the dimensions can be freely selected, they allow of fitting the vessels with similar and uniformly disposed elements in all the stages. But nothing prevents for instance the fitting of the same elements into a circular section. It suffices to select in a suitable manner the dimensions of the elements and the relative positions of the crossed axes. A little device in assembling, consisting in accentuating the bend of certain elements in the neighborhood of the walls, allow of fitting elements in almost the whole circular section, the rectilinear contours of the elements forming a polygon inscribed in the circumference. The very small space which remains and is imposed by the geometrical shape of the vessel can be filled up by a flat sheet or even left free, for owing to the method of superposition of the stages, it alternates from stage to stage with a fitted portion of the adjacent stage.

These combinations of pyramidal surfaces may be utilized for the purification of fluids in general, that is to say of liquids, vapors or gases.

For the purification of liquids, for example water, they accelerate and improve the decantation for the reasons already set forth. If the apparatus are stationary, the pyramidal elements are simply placed on their supports, the juxtaposition and interengagement of the up-turned triangles having the effect of giving solidarity to all the parts in the same stage. A certain mobility of the elements cannot in any event present any disadvantage in this particular case. If movable apparatus are to be established, as for instance for ships, there would be no objection to fixing the elements upon the supports.

For the purification of vapors, it is especially important to consider the case of steam, which sometimes requires to be dried by retaining the water primed from the boilers, and sometimes to be freed from oil, by separating the oil from the exhaust steam of engines before delivering it to the condensers or to the atmosphere. The pyramidal surfaces constitute for these applications, which naturally may be extended to all other vapors carrying liquid or solid particles, obstacles perfectly suited to the object to be attained, with this enormous advantage that the surface can be multiplied at will without increasing the volume of the vessel and without altering the sectional area of the passage, that is to say without increasing the loss of pressure. Of course for these applications to the purification of vapors, it is advisable to fix the pyramidal elements upon their supports, in order that the circulation shall not cause them to vibrate.

For the purification of gases, it is especially important to consider the treatment of coke-oven gases or blast-furnace gases, which must be freed from cinders and dust in order to be employed in gas-engines. The principle remains the same as for vapors, but the difficulty to be overcome is very much greater. It is therefore particularly advantageous to possess the faculty of multiplying at will the surface of the obstacles without creating an excessive loss of pressure.

Referring to the explanations already given on the subject of the distortion of the horizontal plane of the fluid during its ascent, it will be understood that the combination of pyramidal surfaces in question realizes the most favourable conditions for displacing the molecules, that is to say, it forms a mixing device properly so-called and of remarkable efficiency. There can in this way be found a very large number of useful applications.

It is naturally not indispensable that the elements composing these pyramidal surfaces shall be obtained by simple bending of flat sheets. This solution is the most desirable when it is a question of metal sheets because it is the most economical. There may be employed in these conditions, iron, zinc, galvanized sheets, lead, tin, copper, brass, aluminum or other, according to the nature of the fluids to be treated. For applications where the use of metal plates would not be convenient, there may be employed moulded or cast pieces. For example, for the treatment of acid liquids, vapors or gases, there may be adopted pyramids of glass or porcelain, or of any other non-attacked material, obtained in the desired shape by suitable methods.

Having now particularly described and ascertained the nature of my said invention and in what manner the same is to be performed, I declare that what I claim is:—

1. A diaphragm unit for the purpose set forth, said unit having the shape of a dihedral angle with closed apex, the two faces of which are of substantially triangular form and comprise on each of their sides a lateral face, likewise of substantially triangular form and angularly arranged in relation to the corresponding face of the dihedral angle.

2. A diaphragm unit for the purpose set forth, said unit comprising a rectangular sheet having its corners offset by bending upon lines parallel to straight lines joining the ends of the axes of the sheet, and the body of the sheet bent by folding upon one of its axes.

3. A diaphragm for the purification of liquids, vapors and gases, comprising a series of units of the construction specified in claim 1, juxtaposed upon parallel rectilinear axes, in multiple rows to form substantially pyramidal surfaces by their combination.

4. A diaphragm for the purification of liquids, vapors and gases, comprising a series of units of the construction specified in claim 1, juxtaposed upon parallel rectilinear axes, in multiple rows in several stages, the rectilinear axes of the units being crossed at right angles from stage to stage, so as to form substantially pyramidal surfaces by their combination.

In testimony whereof I have signed my name to this specification.

PAUL HENRI AUGUSTE GAILLET.

Witnesses:
W. DAFEVREMONT,
F. VALENBE.